United States Patent [19]
Bible et al.

[11] 3,937,244
[45] Feb. 10, 1976

[54] CONDITION RESPONSIVE VALVE CONSTRUCTION

[75] Inventors: Harley V. Bible, Maryville; William T. Moon, Jr., Knoxville, both of Tenn.

[73] Assignee: Robertshaw Controls Company, Richmond, Va.

[22] Filed: Oct. 21, 1974

[21] Appl. No.: 516,429

[52] U.S. Cl............................. 137/269; 236/99 R
[51] Int. Cl.²......................................... F16K 31/00
[58] Field of Search ........... 137/269, 271, 494, 495, 137/455, 510, 508, 505.21, 510, 505.18; 251/61, 61.1, 61.2, 61.3, 61.4, 61.5, 335 B, 318, 319, 320; 236/99 R

[56] References Cited
UNITED STATES PATENTS

| 646,428 | 4/1900 | Hardie | 137/505.18 |
|---|---|---|---|
| 757,502 | 4/1904 | Royle | 137/505.18 |
| 2,885,173 | 5/1959 | Dobrick | 137/510 X |
| 3,319,649 | 5/1967 | Cummins | 137/505.18 |
| 3,561,468 | 2/1971 | Sugden, Jr. | 137/269 |

Primary Examiner—Martin P. Schwadron
Assistant Examiner—Robert J. Miller
Attorney, Agent, or Firm—Candor, Candor & Tassone

[57] ABSTRACT

A condition responsive valve construction having a housing provided with an inlet and an outlet leading to and from a chamber therein. A self-contained valve seat and movable valve member unit is removably disposed in the chamber to control the interconnection between the inlet and the outlet. Condition responsive means are carried by the housing for controlling movement of the valve member relative to the valve seat in relation to the condition sensed by the condition responsive means. The self-contained unit is either a direct acting unit or a reverse acting unit while still being adapted to be operated by the same condition responsive means whereby the condition responsive valve construction can be either direct acting or reverse acting, depending upon the self-contained unit removably disposed in the chamber thereof.

9 Claims, 11 Drawing Figures

FIG.2

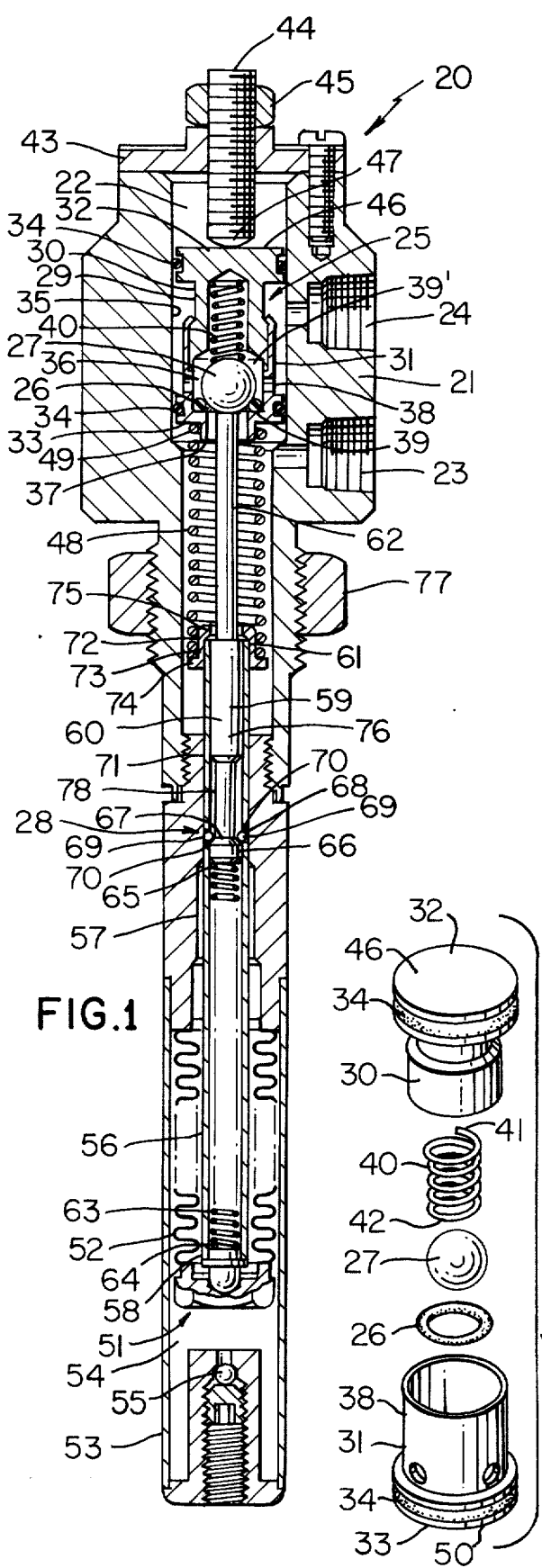
FIG.1
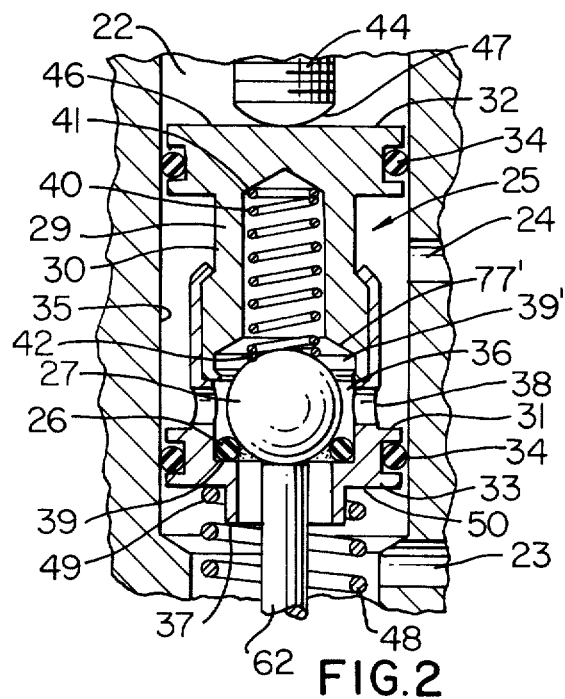
FIG.2
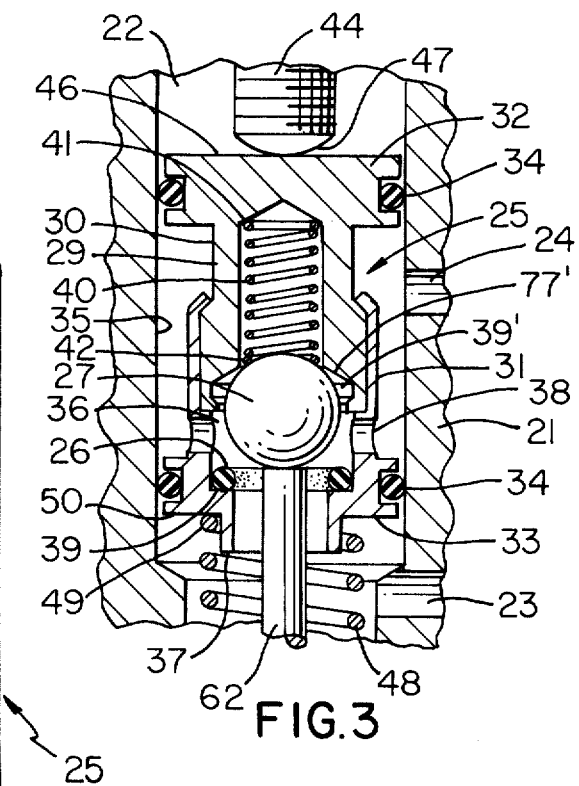
FIG.3
FIG.4

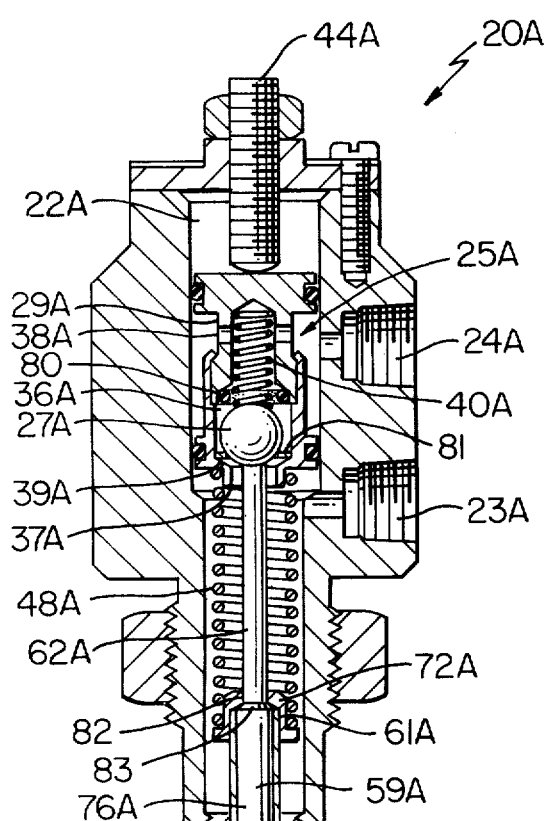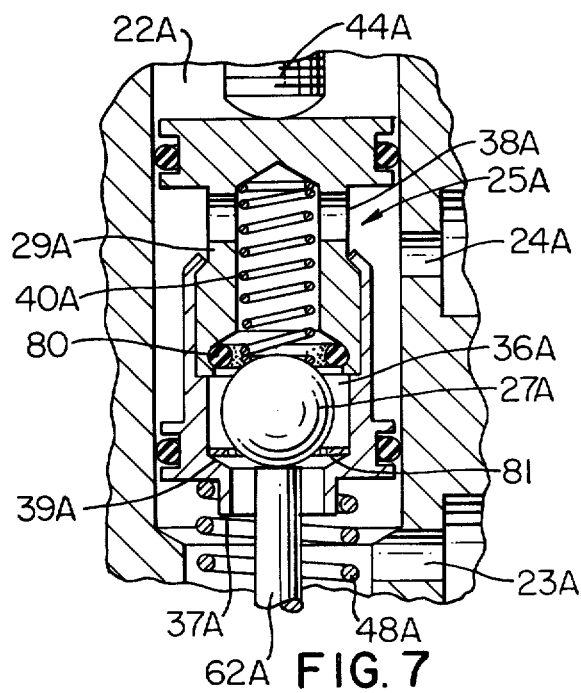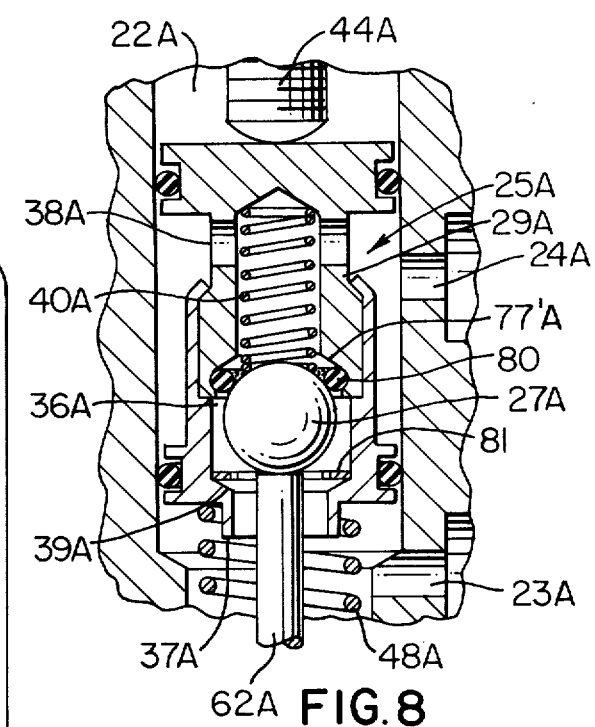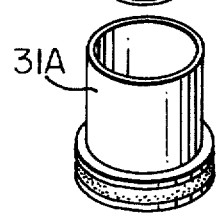

CONDITION RESPONSIVE VALVE CONSTRUCTION

This invention relates to an improved condition responsive valve construction as well as to improved parts for such a valve construction or the like.

It is well known that valve constructions have been provided wherein each is adapted to have a valve member moved in relation to a condition being sensed by condition responsive means of the valve construction with such valve member opening and closing a valve seat disposed intermediate an inlet and an outlet of the valve construction. Such valve construction can be direct acting in that the valve member is moved to an open condition as the condition being sensed increases or the valve construction can be reverse acting in that the valve member is moved to a closed position as the condition being sensed increases.

Accordingly, it is a feature of this invention to provide a valve construction of the above type that is adapted to be converted from either a direct acting arrangement to a reverse acting arrangement or vice versa through the mere substitution of a self-contained valve seat and movable valve member unit therein.

Another feature of this invention is to provide improved condition responsive means for such a valve construction or the like.

In particular, one embodiment of this invention provides a condition responsive valve construction having a housing means provided with an inlet and an outlet leading to and from an internal chamber of the housing means. A self-contained valve seat and movable valve member unit is removably disposed in the chamber to control the interconnection between the inlet and the outlet. Condition responsive means are carried by the housing means for controlling movement of the valve member relative to the valve seat in relation to the condition sensed by the condition responsive means. The self-contained unit is either a direct acting unit or a reverse acting unit while still being operated by the same condition responsive means whereby the condition responsive valve construction can be either direct acting or reverse acting, depending upon the self-contained unit being removably disposed in the chamber thereof. The condition responsive means can comprise a plunger that is engageable with the valve member to move the same upon movement of the plunger. A tubular member forms part of the condition responsive means and telescopically receives a portion of the plunger therein. The condition responsive means has a movable wall operatively associated with the tubular member to move the tubular member relative to the valve seat in relation to the condition being sensed. Means are provided for normally maintaining a certain telescoped relation of the plunger and the tubular member during movement of the tubular member by the movable wall of the condition responsive means, whereby a change in the telescoped relation of the plunger and the tubular member can be utilized for overrun purposes and/or for permitting the valve construction to fully open its valve seat upon failure in the condition responsive means.

Accordingly, it is an object of this invention to provide an improved condition responsive valve construction having one or more of the novel features set forth above or hereinafter shown or described.

Another object of this invention is to provide improved parts for a condition responsive valve construction or the like, the improved parts of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a cross-sectional view illustrating the improved condition responsive valve construction of this invention which is a direct acting valve construction in FIG. 1.

FIG. 2 is an enlarged, fragmentary view of the valve construction of FIG. 1 and illustrates the valve member in its closed condition.

FIG. 3 is a view similar to FIG. 2 and illustrates the valve member in its open condition.

FIG. 4 is an exploded perspective view of the self-contained valve seat and movable valve member unit for the valve construction of FIG. 1.

FIG. 6 is a view similar to FIG. 1 and illustrates another embodiment of the valve construction wherein the same is a reverse acting valve construction.

FIG. 7 is an enlarged fragmentary view of the valve portion of the valve construction of FIG. 6 and illustrates the valve member thereof in an open condition.

FIG. 8 is a view similar to FIG. 7 and illustrates the valve member in a closed condition.

FIG. 9 is an exploded perspective view of the various parts of the self-contained valve seat and movable valve member unit of the valve construction of FIG. 6.

Figure 5:
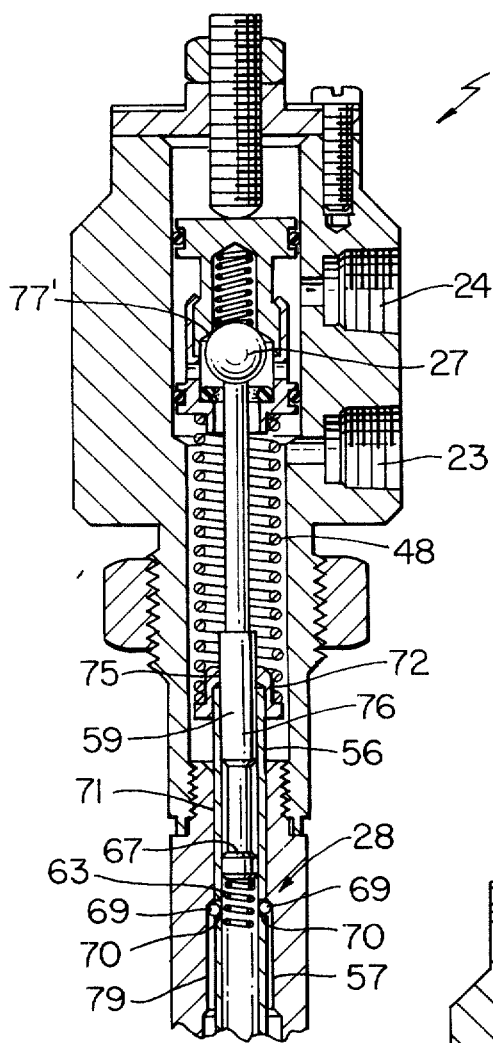
FIG. 5 is a fragmentary view similar to FIG. 1 and illustrates the valve construction when the condition responsive means has lost its fluid.

While the various features of this invention are hereinafter described and illustrated as being particularly adaptable to provide a temperature responsive valve construction, it is to be understood that the various features of this invention can be utilized singly or in any combination thereof to provide valve constructions responsive to other conditions as desired.

Therefore, this invention is not to be limited to only the embodiments illustrated in the drawings, because the drawings are merely utilized to illustrate one of a great variety of uses of this invention.

Referring now to FIGS. 1–4, the valve construction of this invention is generally indicated by the reference numeral 20 and comprises a housing means 21 formed from a plurality of parts secured together as illustrated to define an internal chamber 22 of substantially cylindrical configuration and having an inlet 23 and an outlet 24 respectively leading thereto and therefrom so that a fluid source (not shown) can be interconnected to the inlet 23 and a fluid operated device or vent can be interconnected to the outlet 24 to be controlled by the amount of fluid being permitted by the valve construction 20 to reach the same from the inlet 23 in a manner hereinafter described.

A self-contained valve seat and movable valve member unit of this invention is generally indicated by the reference numeral 25 and is sealingly disposed in the chamber 22 of the housing 21 so as to dispose its valve seat 26 intermediate the inlet 23 and outlet 24 to control the interconnection therebetween in relation to the position of its valve member 27 relative to the valve seat 26 controlled by a condition responsive means of the valve construction 20 that is generally indicated by the reference numeral 28 and operated in a manner hereinafter described.

As best illustrated in FIGS. 2–4, the self-contained valve seat and movable valve member unit 25 comprises a retainer 29 formed from two parts 30 and 31 suitably secured together and defining a spool-like construction having opposed cylindrical ends 32 and 33 respectively carrying O-ring seals 34 in the outer peripheries thereof for sealing against the internal peripheral surface 35 of the chamber 22 as illustrated while still permitting the self-contained unit 25 to be axially moved in the chamber 22 in a manner hereinafter described.

The retainer 29 has a passage means 36 passing therethrough and interrupting an end surface 37 and a side surface 38 of the retainer 29 as well as defining a chamber-like area 39' therein to trap the valve member 27 therein, the valve member 27 being a ball valve member and the valve seat 26 being defined by an O-ring seal-like member disposed against an internal shoulder 39 of the retainer 29. A compression spring 40 is disposed in the chamber 39' of the retainer 29 and has one end 41 bearing against the retainer 29 while the other end 42 bears against the ball valve member 27 to tend to urge the ball valve member 27 against the valve seat 26 and thereby tend to prevent fluid communication through the passage means 36 of the retainer 29 and, thus, fluid flow between the inlet 23 and outlet 24.

The self-contained unit 29 can be removably disposed in the chamber 22 of the valve construction 20 by the removal of an end cap 43 of the housing means 21 and after the unit 25 has been disposed therein and the cap 43 replaced, the position of the unit 25 relative to the condition responsive means 23 can be adjusted by a threaded adjusting member 44 carried by the end cap 43 and being adapted to be locked in its threaded relation by a lock nut 45 or the like. In this manner, the end 46 of the unit 25 can abut against the end 47 of the adjusting member 44 as a compression spring 48 of the condition responsive means 28 has one end 49 bearing against the other end 50 of the unit 25 to tend to urge the unit 25 into continuous engagement with the end 47 of the threaded adjusting member 44 as illustrated in the drawings whereby the valve member 27 is adapted to be initially opened relative to the valve seat 26 by the condition responsive means 28 sensing a certain condition as selected and set by the adjusting member 44 as will be apparent hereinafter.

The condition responsive means 28 of the valve construction 20 comprises a bellows arrangement that is generally indicated by the reference numeral 51 and includes a movable bellows-like wall 52 cooperating with a tubular part 53 of the housing 21 to define a chamber 54 receiving a suitable condition responsive fluid (not shown) therein that is adapted to be sealed in the chamber 54 of the bellows construction 54 by a ball seal 55 as illustrated.

For example, the fluid contained in the chamber 54 can be temperature responsive so that as the temperature thereof increases, the volume of the fluid in the chamber 54 increases and thereby acts on the movable wall 52 to tend to drive the same upwardly in FIG. 1 and, conversely, as the temperature of the fluid in the chamber 54 decreases, the volume thereof decreases and thereby permits the movable wall 52 to be moved downwardly in FIG. 1 by the force of the compression spring 48 as will be apparent hereinafter.

A tubular member 56 of the condition responsive means 28 is disposed in a stepped bore 57 that passes through part of the housing means 21 and has a closed end 58 thereof disposed in contact with the movable wall 52 so that the tubular member 56 will tend to follow movement of the movable wall 52 of the condition responsive means 28.

A plunger 59 forms part of the temperature responsive means 28 and has a portion 60 thereof telescopically disposed in the upper end 61 of the tubular member 56 while a remaining part 62 of the plunger 59 projects out of the end 61 of the tubular member 57 and is adapted to extend into the passage 36 of the retainer 29 and engage against the ball valve member 27 as illustrated in FIGS. 1 and 2 to control movement of the valve member 27 relative to the valve seat 26 as will be apparent hereinafter.

A compression spring 63 is disposed in the tubular member 56 and has one end 64 bearing against the closed end 58 of the tubular member 56 while the other end 65 thereof bears against the end 66 of the plunger 59 to tend to urge the plunger 59 upwardly relative to the tubular member 56 so as to normally place a shoulder means 67 of the plunger 60 against a shoulder means 68 of the tubular member 57 as illustrated in FIG. 1 so as to tend to maintain a certain telescoped relation of the plunger 59 and the tubular member 56 whereby the plunger 59 and tubular member 56 normally act as a single length unit as will be apparent hereinafter.

The shoulder means 68 of the tubular member 56 comprises a plurality of balls 69 respectively disposed in openings 70 formed in the tubular member 56 and the same are adapted to project into the tubular member 56 to abut against the shoulder 67 of the plunger 59 when the balls 69 are contained in an inward position by a reduced portion 71 of the bore 57 of the housing 21 as the balls 70 will normally be positioned in the reduced portion 71 of the bore 57 during the normal operation of the valve construction 20 as will be apparent hereinafter.

A cup-shaped spring retainer cap 72 is disposed over the upper end 61 of the tubular member 57 and has the lower end 73 of the compression spring 48 acting on its annular flange 74 as illustrated whereby the force of the compression spring 48 not only maintains the closed end 58 of the tubular member 57 against the movable wall 52 of the bellows construction 51 so as to follow movement thereof, but also the force of the compression spring 48 acts against the end 50 of the self-contained unit 25 to maintain its upper surface 56 always in contact with the lower end 47 of the adjusting member 44 as illustrated.

The spring retainer cap 72 has an opening 75 passing therethrough and through which the enlarged part 76 of the telescoped portion 66 of the plunger 59 can pass when the shoulder means 67 thereof clears the shoulder means 68 of the tubular member 56 in a manner hereinafter described.

Therefore, it can be seen that the valve construction 20 of this invention can be formed from relatively simple parts suitably secured together to operate in a manner now to be described.

The valve construction 20 is adapted to be interconnected to a container (not shown) containing a fluid to be monitored thereby in a suitable manner. For example, the valve construction 20 can be attached to such container by a nut arrangement 77 of the housing means 21 in a conventional manner so that the tubular part 53 of the housing means 21 can be immersed in the fluid of the container whereby the temperature responsive means 28 of the valve construction 20 can sense the temperature of such fluid for operating the valve member 27 in a manner now to be described.

Assuming that the temperature of the fluid being sensed by the condition responsive means 28 of the valve construction 20 is below a certain temperature that the adjusting member 44 has been set, the volume of the fluid in the chamber 54 of the valve construction 20 is such that the force of the compression spring 48 maintains the wall 52 of the bellows construction 51 in such a position that the plunger 62 of the condition responsive means 28 is out of engagement with the ball valve 27 so that the force of the compression spring 40 maintains the ball valve member 27 in sealing relation against the valve seat 26 and, thus, prevents fluid communication between inlet 23 and outlet 24 of the valve construction 20.

However, when the temperature of the fluid being sensed by the condition responsive means 28 reaches the certain temperature setting of the adjusting member 44, or slightly above the same, the volume of the fluid in the chamber 54 has expanded in such a manner that the same has forced the movable wall 52 of the bellows construction 51 upwardly in FIG. 1 in opposition to force of the compression spring 48 whereby the tubular member 56 and plunger 59 are moved in unison therewith upwardly as illustrated in FIG. 3 to engage against the ball valve member 27 and move the same off the valve seat 26 in opposition to the force of the compression spring 40 to thereby open the passage 36 of the retainer 29 and permit fluid communication between the inlet 23 and the outlet 24 for control purposes or the like.

Should the expansion of the fluid in the chamber 54 of the valve construction 20 exceed a certain amount so that the ball valve member 27 is driven upwardly against a shoulder 77' of the retainer 29 as illustrated in FIG. 3 so that further upward movement of the ball valve member 27 cannot take place, it can be seen from FIG. 1 that the tubular member 56 will continue to be moved upwardly by the movable wall 52 and carry the shoulder means 68 therewith out of contact with the shoulder means 67 of the plunger 59 as the plunger 59 is no longer permitted to move upwardly by the seating of ball member 27 against the surface 77' and such further upward movement of the tubular member 56 relative to the plunger 59 merely compresses the compression spring 63 to permit such overrun condition of the temperature responsive means 28. Thus, such overrun condition will not adversely effect the self-contained valve seat and valve member unit 25.

During such overrun condition of the valve construction 20, it can be seen that the ball shoulders 69 of the tubular member 57 even though moved out of contact with the shoulder 67 of the plunger 59 will not move out of the openings 70 of the valve construction 56 as the same are maintained in position by the outer peripheral surface 71 of the housing 21 and an inner land surface 78 of the plunger 56 which is disposed intermediate the shoulder 67 and the enlarged part 76 thereof.

When the temperature of the fluid being monitored by the valve construction 20 falls to the certain temperature setting of the adjusting member 44, or slightly below the same, the fluid in the chamber 54 has contracted sufficiently so that the force of the compression spring 48 has again moved the movable wall 52 downwardly whereby the tubular member 56 and plunger 59 are moved downwardly a sufficient distance so that the ball valve member 27 can again be seated against the valve seat 26 by the force of the compression spring 40 as illustrated in FIG. 2.

Therefore, it can be seen that the valve construction 20 will move the ball valve member 27 relative to the valve seat 26 in relation to the condition being sensed by the condition responsive means 28 and the movement of the ball valve member 27 to an open position relative to the valve seat 26 will take place when the condition reaches a certain condition as set by the adjusting member 44 of the valve construction 20 since the position of the valve seat 26 is adjusted by the adjusting member 44.

Should the fluid in the chamber 54 of the condition responsive means 28 leak therefrom so as to provide a failure of the condition responsive means 28, it is desirable that the ball valve member 27 be moved to an open condition during such failure of the condition responsive means 28 so as to fluidly interconnect the inlet 23 to the outlet 24.

The valve construction 20 is provided with such feature because when the fluid in the chamber 54 escapes therefrom through leakage or other failure, the force of the compression spring 48 is sufficient to drive the tubular member 56 downwardly and have the ball shoulders 69 thereof clear the reduced section 71 of the bore 57 and be received in a larger section 79 thereof as illustrated in FIG. 5 so that the ball 69 can move outwardly in the slots 70 of the tubular member 56 as the same are cammed outwardly by the shoulder 67 of the plunger 59 being moved upwardly by the force of the compression spring 63.

With the shoulder means 69 of the tubular member 56 now moved outwardly as illustrated in FIG. 5, the force of the compression spring 63 drives the plunger 59 upwardly and the enlarged portion 76 thereof is adapted to pass through the opening 75 of the spring retainer cap 72 and thereby have the plunger 59 move the ball valve member 27 off of the valve seat 26 to its fully open position against the shoulder 77' as illustrated in FIG. 5 whereby the ball valve member 27 will remain in the open condition by the force of the compression spring 63 until the malfunctioning valve 20 is replaced.

Thus, it can be seen that the valve construction 20 is a direct acting valve construction in that the unit 25 will open the valve seat 26 upon an increase in temperature and will close the valve seat 26 upon a decrease in temperature, the condition responsive means 28 including a safety feature that should the temperature sensing fluid thereof leak therefrom, the valve member 27 will be automatically moved to an open condition. Also, the valve construction 20 provides for an overrun condition of the condition responsive means 28.

Another valve construction of this invention is generally indicated by the reference numeral 20A in FIGS. 6–11 and parts thereof similar to the valve construction 20 previously described are indicated by like reference numerals followed by the reference letter "A."

The condition responsive valve construction 20A of FIGS. 6–11 is substantially identical to the valve construction 20 previously described except that a different self-contained valve seat and movable valve member unit 25A is utilized and a different spring retainer cap 72A is utilized with the condition responsive means 28A to render the valve construction 20A reverse acting in that upon an increase in temperature to or slightly above the certain temperature setting of the adjusting member 44A, the ball valve member 27A closes against a valve seat 80 of the retainer 29A in opposition to the force of the compression spring 40A as the O-ring like seat 80 is disposed against the end surface 77'A of the retainer 20A rather than against the surface 39A thereof as in the case of the self-contained unit 25 of the valve construction 20.

In addition, a retainer 81 is disposed adjacent to the surface 39A of the retainer 29A to prevent the ball valve 27A from closing off against the shoulder 39A when the ball valve member 27A is permitted to be moved to an open position as illustrated in FIG. 7 by the compression spring 40A in a manner hereinafter described, the retainer 81 having flow passages therethrough through which fluid can flow when the ball valve 27A is against the same.

As illustrated in FIGS. 7–9, it can be seen that the retainer 29A has the passage 36A therethrough arranged in such a manner that the side parts 38A thereof are disposed upstream of the valve seat 80 while the plunger 59A is still adapted to enter the end 37A of the retainer 29A to engage the ball valve member 27A and move the same relative to the valve seat 80 in a manner hereinafter described.

The spring retainer cap 72A which is engaged by the compression spring 48A has an opening 82 through the end thereof that closely receives the smaller portion 62A of the plunger 59A so that a shoulder 83 on the enlarged part 76A of the telescoping portion 62A of the plunger 59A abuts against the spring retainer 72A adjacent the opening 82 thereof so that the spring retainer 72A, in effect, provides a shoulder means on the tubular member 56A that cooperates with the shoulder 83 of the plunger 59A to tend to hold the sam in a certain telescoped relation as the force of the compression spring 63A tends to maintain the shoulder 83 of the plunger 59A against the shoulder 72A at the end 61A of the tubular member 56A.

In this manner, the ball shoulder means 68 previously described are eliminated from the tubular member 56A of the valve construction 20A which is adapted to operate in a manner now to be described.

Assuming that the temperature being sensed by the fluid in the chamber 54A of the valve construction 20A is below the certain temperature setting of the adjusting member 44A which positions the unit 25A in the chamber 22A in the manner previously described for temperature selection purposes, the force of the compression spring 48A positions the movable wall 52A of the bellows construction 51A in such a position that the combined length of the tubular member 56A and the plunger 59A is insufficient to position the ball valve member 27A against the valve seat 80 whereby the compression spring 40A maintains the ball valve member 27A against the plunger 59A and away from the valve seat 80 so that the inlet 23A is interconnected to the outlet 24A through the opened valve seat 80.

However, as the temperature sensed by the fluid in the chamber 54A increases to the certain temperature setting of the adjusting member 44A, or slightly above the same, the movable wall 52A has moved upwardly in the manner illustrated in FIG. 8 to position the ball valve member 27A fully against the valve seat 80 and thereby terminate the flow of fluid between the inlet 23A and the outlet 24A as the valve seat 80 is completely closed.

Figure 10:
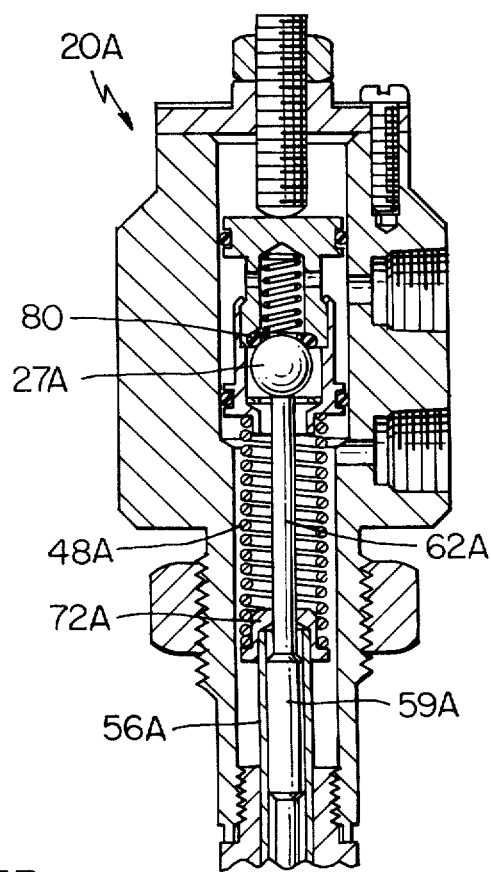
FIG. 10 is a fragmentary view similar to FIG. 6 and illustrates the valve construction in an overrun condition thereof.

Should the temperature being sensed by the fluid in the chamber 54A increase beyond the temperature required to fully seat the ball valve member 27A against the valve seat 80 so that an overrun condition will be created, the tubular member 56A is adapted to be further moved upwardly in the manner illustrated in FIG. 10 to carry the spring retainer end cap 72A therewith in opposition to the force of the compression spring 48A as the plunger 59A remains in the position illustrated in FIG. 10 by the ball valve member 27A being completely disposed against the valve seat 80 whereby the compression spring 63A in the tube 56A is further compressed to allow for such overrun condition.

When the temperature being sensed by the fluid 54A falls to the certain temperature setting of adjusting member 44A, or slightly below the same, it can be seen that the movable wall 52A is moved downwardly by the compression spring 48A a distance sufficient for the tubular member 56A and the plunger 59A to permit the valve member 27A to open the valve seat 80 as illustrated in FIG. 7.

Thus, the valve member 27A is adapted to be cycled relative to the valve seat 80 in relation to the temperature being sensed by the fluid in the chamber 54A as previously described for the valve construction 20 except that the valve construction 20A is reverse acting as the self-contained unit 25A is reverse acting whereby upon an increase of temperature the valve member 27A is moved toward the valve seat whereas in the unit 25, the valve member 27 is moved away from the valve seat 26 upon an increase in temperature.

Figure 11:
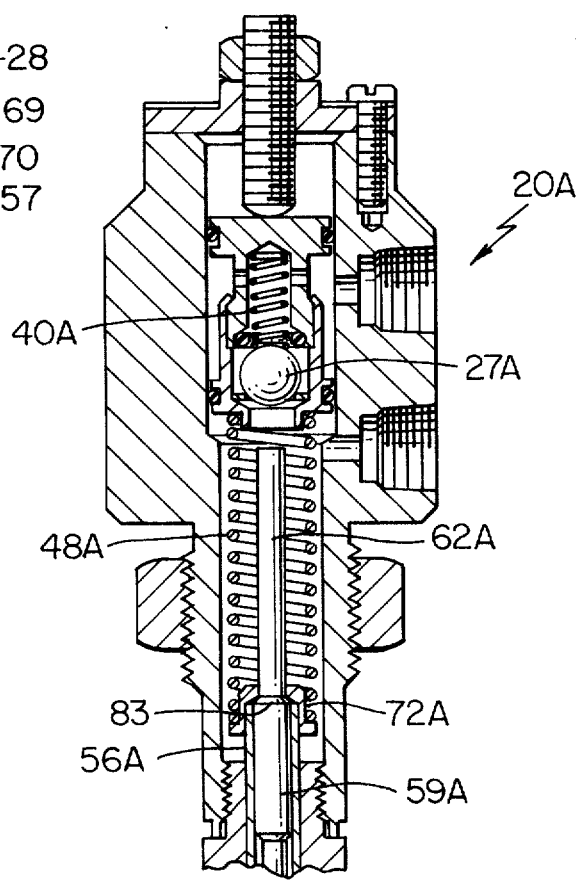
FIG. 11 is a view similar to FIG. 10 and illustrates the valve construction when the condition responsive means thereof has lost its fluid.

Should the bellows construction 51A of the condition responsive valve construction 20A lose its fluid through leakage or the like, the valve member 27A is automatically moved to the open condition by the force of the compression spring 40A as the force of the compression spring 48A acting on the spring retainer end cap 72A will drive the tubular member 56A downwardly and through the cooperating shoulder means 83, 72A, the plunger 59A will be carried therewith so that the spring 40A can move the valve member 27A to its fully opened condition as illustrated in FIG. 11.

Thus, it can be seen that the valve construction 20A is reverse acting and will automatically cause the valve member thereof to move to an open condition should the bellows construction 51A fail in the manner previously described.

Accordingly, it can be seen that this invention not only provides an improved condition responsive valve construction, but also this invention provides improved parts for such a valve construction or the like.

While the forms of the invention now preferred have been described and illustrated as required by the Patent Statute, it is to be understood that other forms can be utilized and still come within the scope of the appended claims.

What is claimed is:

1. A condition responsive valve construction comprising a housing means having a chamber therein and an inlet and an outlet leading to and from said chamber, a self-contained valve seat and movable valve member unit removably disposed in said chamber to control the interconnection between said inlet and said outlet, said self-contained unit comprising a retainer having a part thereof sealingly disposed in said chamber between said inlet and said outlet and having passage means therethrough spanning said part thereof and being in communication with said inlet and said outlet, said retainer having a valve seat in said passage means, said retainer having a movable valve member disposed in said passage means and being retained therein by said retainer whereby said self-contained unit of said retainer and valve seat and valve member can be removed as a unit from said chamber, and condition responsive means carried by said housing means and being operably associated with said valve member while being separate therefrom for controlling movement of said valve member relative to said valve seat in relation to the condition sensed by said condition responsive means, said self-contained unit being either a direct acting unit or a reverse acting unit while still being operated by the same condition responsive means whereby said condition responsive valve construction can be either direct acting or reverse acting depending upon the self-contained unit being removably disposed in said chamber thereof.

2. A condition responsive valve construction as set forth in claim 1 wherein said condition responsive means includes a movable plunger that is receivable in said passage means to engaged said valve member to move the same relative to said valve seat.

3. A condition responsive valve construction as set forth in claim 2 wherein a spring is carried in said passage means of said retainer and engages said valve member to tend to move said valve member in one direction relative to said valve seat.

4. A condition responsive valve construction as set forth in claim 3 wherein said valve member comprises a ball.

5. A condition responsive valve construction as set forth in claim 1 wherein said retainer has another part thereof sealingly disposed in said chamber in spaced relation to the first-named part thereof, one of said inlet and said outlets being disposed intermediate said parts of said retainer.

6. A condition responsive valve construction as set forth in claim 6 wherein said retainer is spool-like in configuration.

7. A condition responsive valve construction as set forth in claim 1 wherein said housing means has means for adjusting the position of said retainer in said housing means.

8. A condition responsive valve construction as set forth in claim 7 wherein said means for adjusting said retainer comprises a threaded adjusting member threadedly carried by said housing means and engaging said retainer to move said retainer relative to said housing means as said adjusting member is being threaded relative to said housing means.

9. A condition responsive valve construction as set forth in claim 8 wherein said means for adjusting said retainer comprises a spring carried by said housing means and engaging said retainer to urge said retainer into contact with said threaded adjusting member.

* * * * *